United States Patent
Jacobs

[11] 3,759,058
[45] Sept. 18, 1973

[54] COMPRESSOR SHAFT SEAL HEATER
[75] Inventor: James W. Jacobs, Dayton, Ohio
[73] Assignee: General Motors Corporation, Detroit, Mich.
[22] Filed: June 30, 1972
[21] Appl. No.: 268,069

[52] U.S. Cl. .................................. 62/228, 62/323
[51] Int. Cl. .......................................... F25b 27/00
[58] Field of Search ..................... 62/323, 228, 243

[56] References Cited
UNITED STATES PATENTS
2,807,147  9/1957  Jacobs ............................ 62/323 X Primary Examiner—William E. Wayner
Attorney—Frank J. Soucek et al.

[57] ABSTRACT

A vehicle air conditioning compressor is selectively driven by the engine as required to cool the passenger compartment. The compressor includes a rotating shaft supporting a driving pulley and an electrically actuated clutch assembly connecting the shaft with the pulley during periods of air conditioning. The electrically actuated clutch includes a solenoid coil disposed in the proximity of a fluid seal preventing loss of refrigerant from the compressor around the compressor shaft. Control circuitry is provided in series with the ignition switch and includes a first current path to the clutch solenoid coil for energizing the clutch and connecting the compressor with the engine. A second current path is provided between the ignition switch and the solenoid coil, the second path including a resistance of a predetermined value thereby limiting the amount of current flow to the solenoid coil so that when the circuit is completed through the second current path the solenoid coil acts as a heater and warms the shaft seal preventing damage thereto during cold weather conditions. The resistance in the second current flow path can also be positioned in proximity to the fluid seal and likewise act as a heater in conjunction with the solenoid coil to warm the fluid seal during low temperature conditions. A bimetallic switch assembly is provided in both the first and second current paths and responds to ambient temperatures above a predetermined value to complete the circuit through the first current path so that the compressor may be drivingly connected to the engine by the clutch and cool the passenger compartment. When temperatures reach a predetermined low value the ambient temperature sensing switch moves to complete the circuit through the second current path so that the resistance and the solenoid coil can be energized to warm the fluid seal prior to operation of the compressor thereby preventing damage to the seal that would ordinarily occur.

3 Claims, 3 Drawing Figures

Patented Sept. 18, 1973 3,759,058

COMPRESSOR SHAFT SEAL HEATER

My invention relates to means for heating a shaft seal and more particularly to means utilizing a clutch actuating solenoid coil to heat a vehicle air, conditioning compressor shaft seal assembly.

Starting of a vehicle air conditioning compressor after the unit has been exposed to cold weather conditions, often results in compressor shaft seal failure due to stiffness of the material comprising the seal and the high viscosity of a lubricant between the stationary members of the seal and surfaces of the rotating shaft. In fact, if the lubricant is of the type provided with a parrafin base, it is possible for a precipitant to form out of the lubricant during cold weather conditions and create a bond between the relatively moving members of the shaft seal. Subsequent operation or rotation of the shaft is retarded by the bond existing between the relatively movable members which frequently results in a rupturing of the seal eliminating its effectiveness during subsequent operation of the compressor.

The compressor shaft seal heater arrangement of the subject invention has particular application to a vehicle air conditioning compressor comprising a continuously driven pulley selectively engaged to drive the compressor upon energization of a magnetic clutch assembly. The magnetic clutch assembly includes the usual solenoid coil, toroidal in form, substantially concentrically disposed about a shaft seal assembly spring biased into contact with the exterior surface of the shaft. A lubricant is supplied to the shaft seal from an integral sump assembly by a pump driven by the compressor shaft when drivingly connected with the engine driven pulley. A film of lubricant is necessary between the relatively movable surfaces of the seal assembly so as to prevent deterioration thereof and provide the final sealing effect of the assembly. During cold weather conditions this lubricant becomes highly viscous and may even precipitate a substance tending to create a bond between the relatively movable surfaces. Addition of a warming circuit in conjunction with the usual air conditioning control circuitry provides a means of selectively warming the seal assembly as a bimetallic ambient temperature sensing switch responds to predetermined cold weather conditions and energizes the solenoid coil with a current flow sufficient to generate heat in the coil but insufficient to actuate the clutch assembly so that heat therefrom is conducted to the seal assembly preventing high viscosity and the tendency of the lubricant to precipitate a bonding material. In this manner damage to the seal assembly resulting from exposure to cold weather conditions is prevented.

The compressor shaft seal heater of this invention comprises the addition of a branch circuit in the air conditioning control circuitry which includes a resistance of a predetermined value. An ambient temperature sensing switch is placed in the control circuitry so as to regulate current flow through a first path to the clutch solenoid coil providing full current flow to the coil for actuation of the compressor clutch. The ambient temperature sensing switch also controls current flow through a second current path through the aforementioned branch circuit containing the resistance of a specified value. The resistance in the second path of current flow regulates the amount of current supplied to the clutch solenoid coil to a magnitude insufficient to actuate the clutch, but of a sufficient value to energize the coil generating heat to warm the compressor shaft seal assembly concentrically located within the solenoid coil. The ambient temperature sensing switch is selected to have characteristics such that a movable bimetallic disk therein snaps to a first position closing the first current flow path to the clutch solenoid for actuation of the clutch when the ambient temperature is above approximately 32° F. The bimetallic disk likewise includes the characteristic of snapping to open the first current flow path and close the second current flow path through the resistance in the branch circuit for energizing the solenoid coil and generating heat when temperatures, for example, are below 25° F. Of course, it is apparent that an ambient temperature sensing switch can be selected to close the circuit for energizing the clutch solenoid at any desirable temperature and further can be selected to close the second current flow path for warming the seal assembly at any predetermined lower temperature.

A general object of the subject invention is to provide electrical circuitry cooperable with a clutch solenoid coil in thermal communication with a seal assembly otherwise having a tendency to bond relatively rotatable elements, effective to generate heat warming said seal assembly preventing damage resulting from the bonding during cold weather conditions.

A further object of the subject invention is to provide electrical circuitry in the usual vehicle air conditioning control circuitry including a resistance having a predetermined value limiting current flow to a clutch solenoid actuating coil in thermal communication with an air conditioning compressor shaft seal assembly, effective to excite the coil generating heat warming the seal assembly.

Another object of the subject invention is to provide electrical circuitry in the usual vehicle air conditioning control circuitry including a resistance limiting current flow to a clutch solenoid actuating coil; both the resistance and the coil being in thermal communication with a compressor shaft seal assembly whereby the coil and the resistance cooperate generating heat warming the compressor shaft seal assembly preventing the tendency of the relatively rotatable elements of the seal assembly to bond during cold weather conditions.

A more complete understanding of the present invention may be had from the following detailed description which should be taken in conjunction with the drawings in which.

Figure 1:
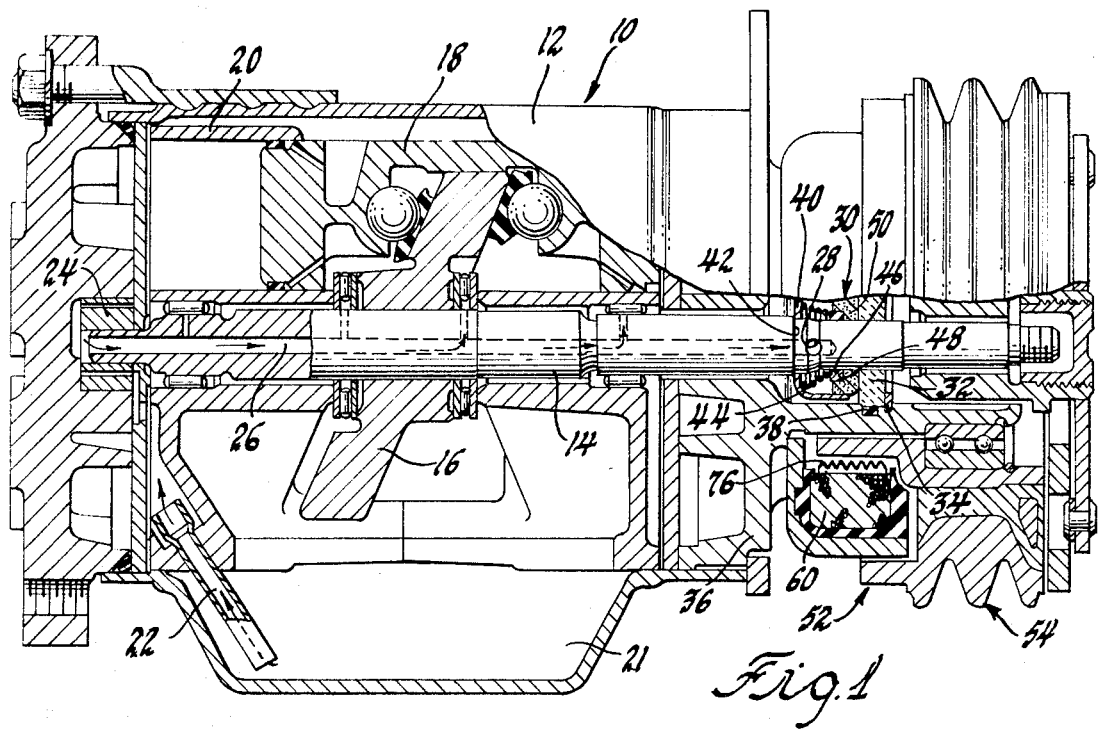
FIG. 1 is a partial cross sectional view illustrating a vehicle air conditioning compressor including the usual solenoid coil incorporated in a magnetic clutch.

Referring now to the drawings and initially to FIG. 1, a vehicle air conditioning compressor assembly 10 includes a casing 12 enclosing shaft 14 rotatably driving a swash plate assembly 16 reciprocating a plurality of pistons 18 within axially extending cylinders 20. The casing 12 is formed to include a lubricant sump 21 from which the lubricant is drawn through a tube 22 to a conventional gear pump assembly 24 which discharges the lubricant under pressure through a passage 26 in the shaft 14. The lubricant eventually is discharged through orifices 28 to lubricate a shaft seal assembly 30. The shaft seal assembly 30 includes a ceramic disk 32 retained by a snap ring 34 and being in sealed engagement with end plate 36 by an O-ring seal 38. An annular sheet metal cup member 40 is placed upon the shaft 14 into engagement with a shoulder 42 thereon. The cup member 40 is positioned upon the shaft with its open area extending toward the ceramic disk 32. Conical coil spring 44 is placed within the sheet metal cup member 40 and engages an annular sealing ring 46 received within a groove 48 formed within a carbon sealing disk 50. The spring 44 by virtue of its engagement with the sheet metal cup 40 and the sealing ring 46 continually urges the carbon disk 50 into rubbing contact with the ceramic disk 32. In order for a complete seal to be formed between the mating surfaces of the carbon disk 50 and the ceramic disk 32, it is necessary that a film of lubricant exist therebetween as supplied from the orifice 28.

During prolonged periods of nonuse, such as those that normally occur during winter seasons, the lubricant existing between the mating surfaces of the carbon disk 50 and the ceramic disk 32 becomes highly viscous tending to prevent or retard rotation of the carbon disk 50 with shaft 14 when the compressor is drivingly connected to the vehicle engine as a result of the energization of an electromagnetic clutch assembly 52. If the seal assembly 30 is subjectd to sufficiently severe cold weather conditions the lubricant existing between the engaged surfaces of the carbon disk 50 and the ceramic disk 32 may precipitate a material or substance having a tendency to actually bond the engaged surfaces. When the lubricant has precipitated such substance and the compressor shaft 14 is drivingly connected to a pulley assembly 54 continuously driven by the vehicle engine, the rapid rotation of shaft 14 results in damage to the mating surfaces of the sealing disks 50 and 32.

Figure 2:
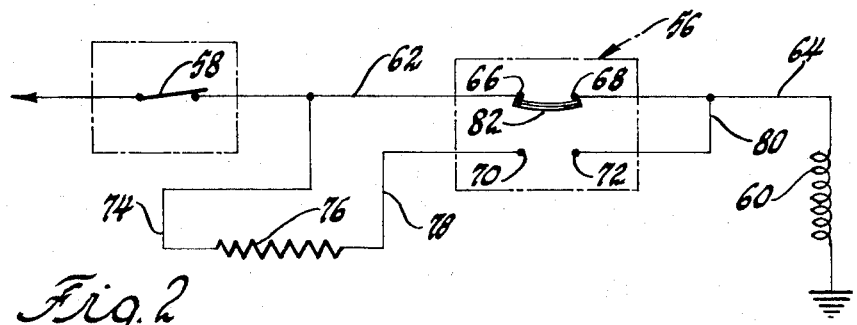
FIG. 2 is a schematic view of a portion of the air conditioning control circuitry including the branch circuit and the ambient temperature sensing switch assembly of the subject invention.

In order to prevent the lubricant film between the engaged surfaces of the seal assembly 30 from becoming highly viscous and from precipitating a substance tending to bond the relatively movable members together, the air conditioning control circuitry is provided with an ambient temperature sensing switch assembly 56 thus shown in FIG. 2. The control circuitry includes the usual air conditioning off-on switch 58 which is in series circuit with clutch actuating solenoid coil 60. The air conditioning on-off switch 58 is connected to the ambient temperature sensing switch 56 by a lead 62 and the switch 56 is connected with coil 60 by a lead 64. In a preferred form the ambient temperature sensing switch 56 includes contacts 66, 68, 70 and 72, the contacts 66 and 68 being placed in circuit with leads 62 and 64 for regulation of current through a first flow path to the solenoid coil 60 for actuation of the clutch assembly 52. A second flow path is provided by a lead 74 being connected to lead 62, a resistance 76 and a second lead 78 connected with contact 70 of the ambient temperature sensing switch 56. The second flow path includes a third lead 80 which is connected to contact 72 of the ambient temperature sensing switch 56 and connects with leads 64 in the first current flow path. The contacts 66, 68, 70 and 72 of the ambient temperature sensing switch assembly are positioned to provide an open circuit in the respective flow paths in the absence of being engaged by a bimetallic snap disk 82 as illustrated in FIG. 2. When the ambient temperature is above 36° F., plus or minus 4°, as an example, the bimetal disk 82 snaps into engagement with contacts 66 and 68 completing the circuit through the first flow path to the coil 60 for energization of the electromagnetic clutch 52 when air conditioning is demanded by actuation of switch 58. When the ambient temperature falls below a predetermined value, such as, for example 25° F., the bimetal disk 82 snaps into engagement with contacts 70 and 72 opening the circuit through the first current flow path and closing the circuit through the second current flow path so that resistance 76 is effective to reduce and control current flow to coil 60 whereby the coil is effective to generate heat and warm the shaft seal assembly 30 but is ineffective to actuate clutch assembly 52 and drivingly connect pulley assembly 54 with shaft 14.

Figure 3:
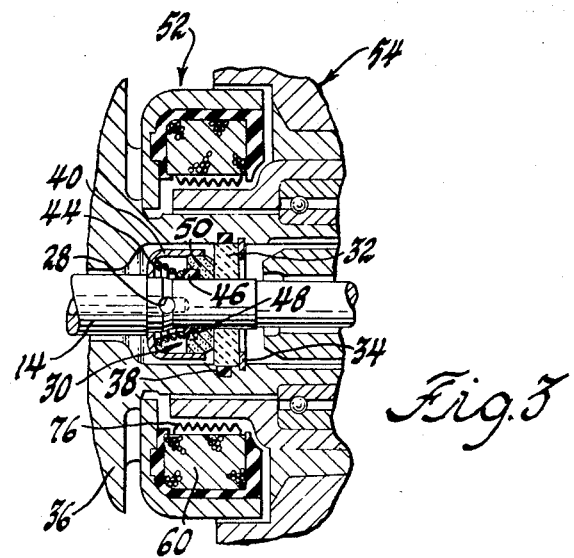
FIG. 3 is a fragmentary cross sectional view illustrating the placing of the resistance in the branch circuit in proximity of the compressor shaft seal assembly so that it may also generate heat effective to warm the seal assembly.

With reference to FIG. 3, the resistance 76 is positioned in proximity to the seal assembly 30 so that it also generates heat effective to join with the heat generated by coil 60 and warm the seal assembly 30. The value of the resistance 76 can be, for example, 3.65 ohms limiting current flow to the coil 60 to approximately 1.6 amps which is insufficient to actuate the clutch. With a supply of 12 volts DC the solenoid coil 60 produces 10 watts and the resistance 76 produces 9.5 watts which are both effective to heat the seal assembly 30 and reduce seal failure during low ambient temperature starts by reducing the viscosity of the lubricant supplied to the seal and preventing precipitation of a substance from the lubricant tending to bond the relatively movable members of the seal.

From the above description it is obvious that the bimetal disk 82 can include characteristics for engaging the contacts 66 and 68 to provide flow of current through the first path for energizing the clutch as desired. It is also apparent that the bimetal disk 82 can be effective to close the circuit through the second flow path for energizing the clutch solenoid coil as a heater in combination with the resistance 76 to warm the seal assembly at any predetermined lower temperature. Further it is possible that the bimetal disk 82 can be designed to remain in an intermediate positon wherein both current flow paths are open until a predetermined higher temperature is sensed and the disk snaps to close the first flow path for energization of the clutch as demanded by the air conditioning selector switch 58. The disk 82 can remain in an intermediate position when it moves to open the first current flow path and upon sensing a predetermined lower temperature then move to close the second current flow path to become operative to energize the resistance 76 and the coil 60 in their capacities as heaters for warming the seal assembly 30. In other words, for example, the current flow path through contacts 66 and 68 can be completed at, for example, a temperature in the vicinity of 36° F. while the circuit would be opened when the temperature decreases below this magnitude and both sets of contacts would remain open until the bimetal disk 82 responds to a lower temperature as, for example, 25° F., whereupon it would move to engage contacts 70 and 72 completing the circuit through the second current flow path.

While I have shown and described a specific embodiment of the present invention it will, of course, be understood that various modifications and alternative constructions may be made without departing from the true spirit and scope of this invention. In particular, it is possible that the solenoid coil 60 could be connected in circuitry with the air conditioning control system in various manners to provide energization thereof for warming the shaft seal assembly 30. For this reason I intend, therefore, by the appended claims to cover all such arrangements falling within the true spirit and scope of these claims.

I claim:

1. In a vehicle air conditioning system for use in a vehicle having an engine and ignition switch and in which the system has prolonged periods of non-operation while the vehicle is being normally operated, a compressor including a fluid seal assembly disposed between surfaces that move relative to each other when the compressor is mechanically driven and subject to damage when the compressor is mechanically driven after being subjected to cold weather conditions during the periods of non-operation, a lubricating pump driven when said compressor is mechanically driven supplying lubricant to said fluid seal assembly, said lubricant and said seal assembly responsive to cold weather conditions tending to bond the relatively movable compressor surfaces together, the improvement comprising: a clutch selectively drivingly connecting said compressor with the vehicle engine, a solenoid including a coil effective when energized to actuate said clutch and drivingly connect said compressor with the vehicle engine, said solenoid further being in thermal communication with said surfaces, control circuitry including the engine ignition switch energizing said solenoid, means defining a first current path in said control circuitry from said ignition switch to said solenoid coil for actuating said clutch and connecting said compressor with the vehicle engine, means defining a second current path from said ignition switch to said solenoid coil supplying said coil with a reduced current flow insufficient to actuate said clutch but of a sufficient magnitude to generate heat in said coil and warm the fluid seal assembly to a non-bonding temperature, and ambient temperature sensing means responsive to ambient temperatures above a predetermined range for completing the circuit through said means defining said first current path and movable in response to low predetermined temperatures to open said means defining said first current path and close said means defining said second current path whereby said solenoid coil operates as a heater during low ambient temperature conditions.

2. In a vehicle air conditioning system for use in a vehicle having an engine and an ignition switch and in which the system has prolonged periods of non-operation while the vehicle is being normally operated, a compressor including a fluid seal disposed between surfaces moving relative to each other when the compressor is mechanically driven and subject to damage when the compressor is mechanically driven after being subjected to cold weather conditions during the periods of non-operation, a lubricating pump driven when said compressor is mechanically driven supplying lubricant to said fluid seal, said lubricant and said seal responsive to cold weather conditions tending to bond the relatively movable compressor surfaces together, the improvement comprising: a clutch selectively drivingly connecting said compressor with the vehicle engine, a solenoid including a coil effective when energized to actuate said clutch, said solenoid being in thermal communication with said surfaces, control circuitry including the ignition switch energizing said solenoid, means defining a first current path connecting said ignition switch to said solenoid coil for energizing said clutch and connecting said compressor with the vehicle engine, means defining a second current path connecting said ignition switch with said solenoid coil, a resistance in said means defining a second current path regulating the flow of current to said solenoid coil whereby the current received by the solenoid coil through said second path and said resistance is inadequate to energize said clutch and connect said compressor with the vehicle engine but is sufficient to energize the solenoid coil generating heat sufficient to warm said fluid seal during cold weather conditions, and an ambient temperature sensing switch regulating the flow of current through both of said means defining said first and second current paths, said switch responding to temperatures above a predetermined value to complete the circuit through said means defining said first path providing for energization of said solenoid coil and connection of the compressor with the vehicle engine, said switch responding to a predetermined lower temperature during cold weather conditions moving to open the circuit through said means defining said first current path and closing the circuit through said means defining said second current path whereby said solenoid coil is energized warming the fluid seal.

3. In a vehicle air conditioning system for use in a vehicle having an engine and an ignition switch and in which the system has prolonged periods of non-operation while the vehicle is being normally operated, a compressor including a fluid seal disposed between surfaces that move relative to each other when the compressor is mechanically driven, the fluid seal being subject to damage by bonding of relatively rotatable surfaces when the compressor is mechanically driven after being subjected to prolonged periods of non-operation during cold weather conditions, a lubricatng pump driven when said compressor is mechanically driven supplying lubricant to said fluid seal, said lubricant and said seal responsive to cold weather conditions tending to bond the relatively movable compressor surfaces together, the improvement comprising: a clutch selectively drivingly connecting said compressor with the vehicle engine, a solenoid including a coil effective when energized to actuate said clutch, control circuitry including the engine ignition switch energizing said solenoid, means defining a first current path in said control circuitry connecting said ignition switch with said solenoid coil for energization of said clutch connecting said compressor with the vehicle engine, means defining a second current path connecting said ignition switch with said solenoid coil, said means defining said second current path including a resistance of a predetermined value regulating current flow to said solenoid coil so as to supply the coil with a current sufficient to energize the coil and generate heat warming said fluid seal but insufficient to energize said clutch, said resistance and said solenoid coil both being in thermal communication with said relatively rotatable surfaces, so that both act as heaters when the circuit through said means defining said second current path is completed, an ambient temperature sensing switch including a pair of spaced contacts in said means defining said first current path and a pair of spaced contacts in said means defining said second current path, and a bimetallic disk disposed between the spaced contacts in both of said current paths so that said disk responds to temperatures above a predetermined value to snap into engagement with the spaced contacts in said means defining said first current path completing the circuit from said ignition switch to said solenoid coil for energization of said clutch, said bimetallic disk being responsive to a predetermined lower temperature and snapping into engagement with the spaced contacts in said means defining said second current path completing the circuit through said resistance from said ignition switch to said solenoid coil thereby warming the fluid seal.

* * * * *